Sept. 2, 1958    H. L. PERAZONE ET AL    2,850,260
GATE VALVE
Filed Aug. 23, 1954
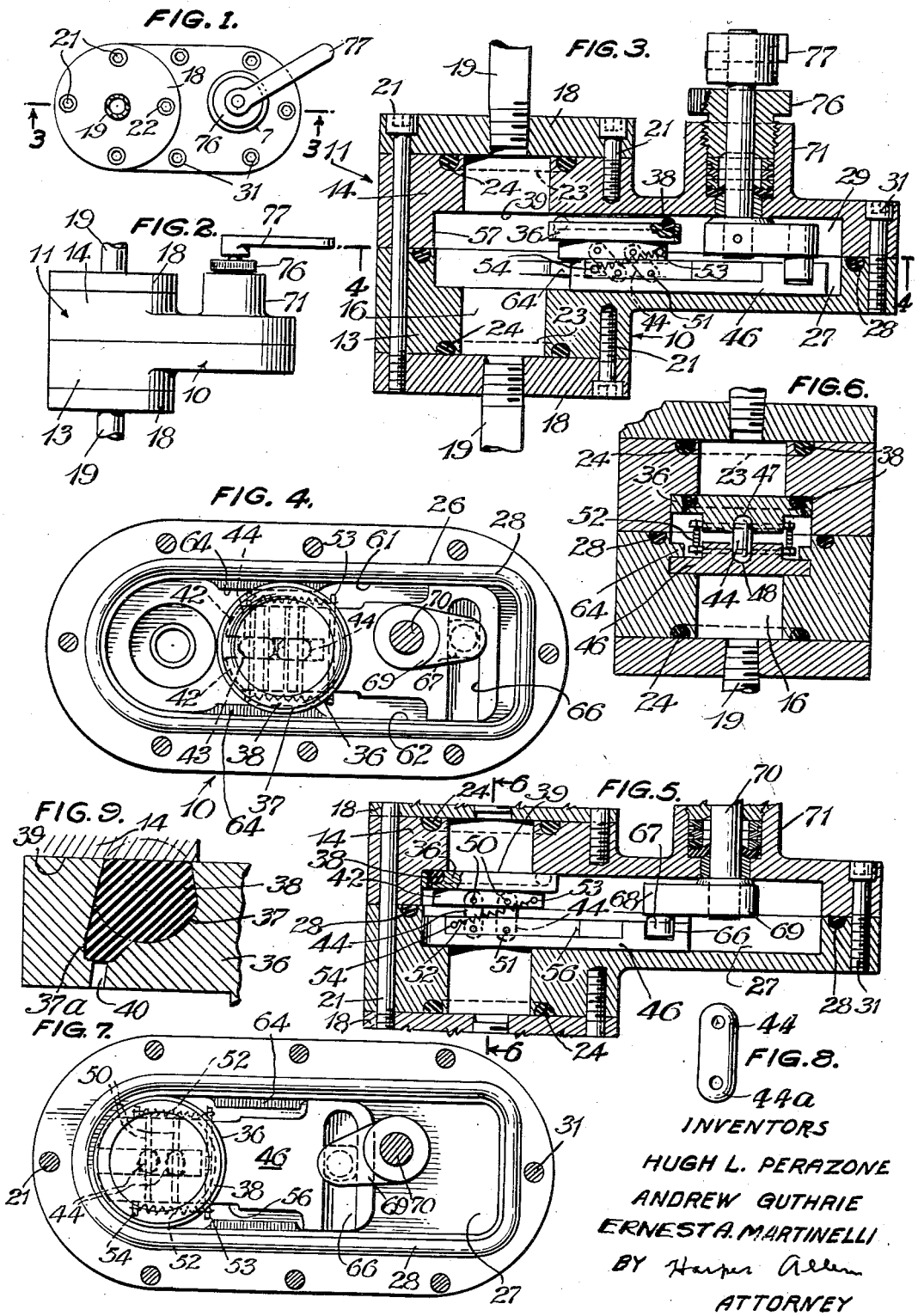
INVENTORS
HUGH L. PERAZONE
ANDREW GUTHRIE
ERNEST A. MARTINELLI
BY Harper Allen
ATTORNEY United States Patent Office 2,850,260
Patented Sept. 2, 1958

2,850,260
GATE VALVE

Hugh Lewis Perazone, Oakland, Andrew Guthrie, Berkeley, and Ernest A. Martinelli, Livermore, Calif., assignors to Vacuum Research Company, a corporation of California Application August 23, 1954, Serial No. 451,545

5 Claims. (Cl. 251—169)

The present invention relates to gate valves of a type useful in high vacuum systems, and more particularly to such a valve in which in the open position of the valve the passage through the valve is entirely unobstructed.

It is the general object of the invention to provide a gate valve of the above character in which the valve element or seal is first brought into overlapping but free relation with the valve passage and is then brought substantially perpendicularly into engagement with the valve seat to avoid wear on the sealing element.

It is another object of the invention to provide a valve of the above character which can be either used as a vacuum valve or as a pressure valve by reversing a sealing element.

It is a further object of the invention to provide a seal construction of the O-ring type which is particularly adapted for use in the handling of liquids.

The above and other objects of the invention are attained as described in connection with a preferred embodiment of the invention, as shown in the accompanying drawings, in which:

Figure 1 is a plan view of the valve.

Figure 2 is a side elevational view of the valve.

Figure 3 is a sectional view taken as indicated by the line 3—3 in Figure 1.

Figure 4 is a sectional elevational view taken as indicated by the line 4—4 in Figure 3.

Figure 5 is a sectional view similar to Figure 3, but showing the valve in closed position.

Figure 6 is a sectional view taken along the line 6—6 in Figure 5.

Figure 7 is a view similar to Figure 4, but showing the valve in closed position.

Figure 8 is a detailed sectional view illustrating the toggle linkage for effecting opening and closing of the valve.

Figure 9 is an enlarged sectional view illustrating the relation of the O-ring and the O-ring groove in the closed position of the valve.

As previously stated, the valve of the instant invention is particularly designed for use in ultra high vacuum work, for example of the type employed in atomic research, and is concerned more particularly with the provision of an improved gate valve of this character in which a straight-through valve passage is provided in the valve casing and in which the valve element or valve per se is first moved to overlap the valve passage without contact with a surface and then is moved into sealing engagement with a sealing surface or valve seat and locked in this position insofar as pressure displacement is concerned.

The valve as shown in Figures 1, 2 and 3 comprises a body or casing made up of a lower part 10 and upper part 11 of generally similar design and provided at one end with apertured bosses 13 and 14 through which the valve passage 16 extends. Respective cover plates 18 carrying connecting conduits 19 are secured to the bosses 13 and 14 by studs 21 which extend entirely through the body parts 10 and 11 and studs 22 which have threaded engagement with the adjacent body part. An annular groove 23 of semi-circular cross-section is provided in each boss 13 and 14 to receive a sealing ring of rubber or other suitable material, the sealing ring 24 engaging the adjacent cover 18 upon tightening of the studs 21 and 22. To seal the meeting faces of the body parts 10 and 11, a peripheral groove 26 of semi-circular cross-section is provided in the body part 10 entirely around the passage 16 and an elongated recess 27 of the body part 10 to receive a sealing element 28 of circular construction which is seated in the groove 26. The outline of the groove is made to conform to the outline of the opening in the body part. The body part 11 has a similar elongated recess 29 and forming a working chamber with the recess 27. A plurality of cap screws 31 are threaded into the body part 10 and have heads seating in the body part 11 to aid in securing the parts together.

The valve element and operating means therefore, comprises a valve disk 36 (Figures 3 and 5) which has an annular groove 37 of special cross-section therein and a sealing ring 38 of circular cross-section which is seated in the groove 37 and is adapted to engage an annular sealing surface or valve seat 39 of the boss 14 to close the valve as shown in Figure 5. The O-ring groove 37 as illustrated in Figure 9 comprises an upper main groove or groove portion of substantially semi-circular cross-section which at the bottom is provided with an enlargement which extends downwardly and outwardly to provide space for the O-ring when the valve surface 39 is engaged with the O-ring 38. Preferably the side walls of the main groove 37 are tapered and diverge from the sealing face of the valve disk 36 and these tapering portions may either be straight or slightly curved.

The bottom portion of the semi-spherical portion part of the groove is generally circular in form and merges with the groove enlargement or expansion space 37a. In general, the circumferential portion of ring 38 when deformed occupies and fills substantially the entire cross-section of groove 37 substantially as shown in Figure 9. The expanded position of the ring 38 is indicated in dot-dash lines. Thus the periphery of the cross-section or the groove 37 is substantially equal or slightly greater in extent than the peripheral dimension of the cross section of the O-ring 38 itself. In order to provide for free expansion or deformation of the O-ring when it is under pressure, the groove extension 37a is connected with the opposite surface of the valve disk 36 by a plurality of apertures or passages 40 so that no undue resistance is provided to the movement of the O-ring 38 because of the presence of a fluid, such as a liquid, in the O-ring groove. In fact the O-ring acts as a pump when under pressure to empty the O-ring groove 37 of liquid by expelling this liquid through the openings 40. This type of O-ring construction is of particular value where liquids are being employed in the system in which the valve is used.

The valve element or disk 36 is provided on its bottom face with a pair of integral mounting pads 42 which are separated by a longitudinal groove 43. A pair of thrust-transmitting toggle links 44 formed of round stock with semi-spherical ends 44a provide a connection from the valve disk 36 to the operating slide or slidable plate 46 therefor, the valve disk 36 and the slide 46 having cooperating semi-spherical recesses 47 and 48 therein to receive the respective ends of the respective toggle links or rods 44. The links 44 are positioned and guided in the groove 43 and a similar groove 48 in the slide 46, and are pivotally connected to the disk 36 by pivot pins 50, and to the slide 46 by similar pivot pins 51. Also, a pair of springs 52 extend from respective pins 53 at the outer sides of the disk pads 42 to a pair of pins 54 in the recessed sidewalls 56 of the slide 46. It will be noted (Figure 3) that the valve disk 36 projects beyond the adjacent end of the slide 46, in position to engage a wall 57 of part 11 during closing movement.

The slide 46 fits closely and is guided between opposed side walls 61 and 62 of the body part 10 and is received beneath opposite guide lugs 64 formed integrally with the body part 10 and projecting outwardly from the walls 61 and 62. At its rearward end the slide 46 is provided with a transverse groove 66 which is engaged by a square operating lug 67 pivoted on pin 68 in a lever arm 69 carried by a shaft 70 extending outwardly through a boss 71 having a Wilson seal of conventional construction seated therein. This seal includes conventional sealing elements 73 and 74 and a pressure nut 76. An operating handle 77 is secured on the outer end of the rod 70. The sealing elements 73 and 74 are positioned as shown to resist pressure from the outside of the valve. When the valve is to be used in a pressure system, the sealing elements are reversed.

The above described valve, when in use, may be of the construction shown including the end plates or cover plates 18 or the valve body may be formed with an external flange where a connection is to be made directly to a part having an internal diameter equal to the cross-section of the passage 16 of the valve. In operation and use in the system it will be noted that approximately a 180° movement of the handle 77 moves the slide 46 from the open position shown in Figure 3 to a position overlying the sealing surface 39 (Figure 5). During the latter part of this movement, the edge of the valve disc 36 engages a wall portion 57 of the valve part 11 when movement of the valve disc 36 stops and continued movement of the slide 46 results, through toggle links 44, in moving the valve disc 36 axially of the passage so that the sealing ring 38 is moved directly against the sealing surface 39. During this movement the springs 52 are extended and the links 44 have their lower ends moved slightly beyond center so as to be locked in this valve-closing position. Because the links 44 have their ends 44a directly seated in thrust transmitting relation in sockets 47 and 48 in the valve disc 36 and the slide 46, the pivot pins 50 and 51 are merely connecting pins and have no thrust transmitting function. By virtue of this mode of operation a substantially reduced size of the operating parts of the valve can be maintained while still having adequate strength for use in high vacuum systems and in moderate pressure systems. During the closing movement of the valve disc 36 the O-ring 38 is deformed from its dotted position in Figure 9 to its full line position so that it occupies the ring-like expansion chamber 37a expelling any liquid or air therein through the passages 40. These same passages 40, upon release of the valve disc or opening of the valve disc 36 enable a quick readjustment of the O-ring 38 to its extended position ready for another operation.

While we have shown a preferred embodiment of the invention, it is apparent that the invention is capable of both variation and modification from the form shown so that the scope thereof should be limited only by the scope of the claims appended hereto.

We claim:

1. A gate valve adapted for sealing high vacuum lines, comprising a casing having a passage therethrough that is adapted to be sealed, said casing also having a chamber communicating with said passage, said chamber having a substantially flat side extending in a direction transverse to said passage, a slidable plate positioned in said chamber, a crank for engaging a slot in one end of said slidable plate, said slidable plate being adapted to be moved by said crank on said substantially flat side to cut across said passage, said chamber also having an end wall adjacent to said passage, a valve disk, links for pivotally supporting said valve disk on said slidable plate substantially parallel thereto so that when said slidable plate is moved across said passage said valve disk is also moved across said passage and abuts said end wall, said valve disk when abutting said end wall being adapted to be swung on said links and pressed into engagement with a sealing surface surrounding said passage by further movement of said slidable plate toward said end wall, said links being adapted to be moved to their over center positions when said slidable plate abuts said end wall which is immediately after said valve disk abuts said end wall so that said valve disk is thereby locked in sealing position with said sealing surface.

2. A gate valve adapted for sealing high vacuum lines, comprising a casing having a passage therethrough that is adapted to be sealed, said casing also having a chamber communicating with said passage, said chamber having a substantially flat side extending in a direction transverse to said passage, a slidable plate positioned in said chamber, a crank for engaging a slot in one end of said slidable plate, said slidable plate being adapted to be moved by said crank on said substantially flat side to cut across said passage, said chamber also having an end wall adjacent to said passage, a valve disk, links for pivotally supporting said valve disk on said slidable plate substantially parallel thereto so that when said slidable plate is moved across said passage said valve disk is also moved across said passage and abuts said end wall, said valve disk when abutting said end wall being adapted to be swung on said links into engagement with a sealing surface surrounding said passage by further movement of said slidable plate toward said end wall, said links being adapted to be moved to their over center position when said slidable plate abuts said end wall so that said valve disk is thereby locked in sealing position with said sealing surface, spring means connected to said valve disk and to said slidable plate for causing said valve disk to lie against said slidable plate until said valve disk is moved into abutment with said end wall and swung on said links away from said slidable plate against the tension of said spring means.

3. A gate valve adapted for sealing high vacuum lines comprising a two-part body, each part of said body having a boss with a valve passage extending therethrough, and each part also having a longitudinal recess extending transversely of the passage therein and forming a working chamber with the recess of the other part, means detachably securing the two parts of the valve body together, one of said parts having a substantially flat side forming one side of said chamber and extending substantially at right angles across said passage, a slidable plate adapted to slide on said substantially flat side, a valve disk, means for pivotally mounting said disk on said slidable plate substantially parallel thereto for movement with respect thereto, said slidable plate including a transverse groove adjacent the other end thereof, and operating means including a shaft pivoted in said body and having means engaging said transverse groove within said chamber and an operating handle mounted thereon outside of said body, said valve disk carrying a sealing ring for engagement with a sealing surface of said body about the valve passage therein, and said mounting means for said valve disk including parallel toggle links having ends engaging said disk and said slidable plate, respectively, said links being normally biased to occupy a position in which said valve disk and the sealing ring therein are spaced from the walls of said chamber, one of said body parts including a wall engageable by said valve disk upon valve closing movement of said slidable plate to stop the movement of said valve disk before the movement of said slidable plate is stopped to thereby cause pivoting movement of said toggle links to their over center position on further movement of said slidable plate, the other of said body parts including a wall engageable by said slidable plate just as said toggle links swing to their over center position whereby said links are prevented from further swinging movement so that said sealing ring is locked in sealing relation with said sealing surface.

4. A gate valve adapted for sealing high vacuum lines, comprising a casing having a passage therethrough that is adapted to be sealed, said casing also having a chamber communicating with said passage, said chamber having a substantially flat side extending in a direction transverse to said passage, a slidable plate positioned in said chamber, a crank for engaging a slot in one end of said slidable plate, said slidable plate being adapted to be moved by said crank on said substantially flat side to cut across said passage, said chamber also having an end wall adjacent to said passage, a valve disk, links for pivotally supporting said valve disk on said slidable plate substantially parallel thereto so that when said slidable plate is moved across said passage said valve disk is also moved across said passage and abuts said end wall, said valve disk when abutting said end wall being adapted to be swung on said links and pressed into engagement with a sealing surface surrounding said passage by further movement of said slidable plate toward said end wall, said links being adapted to be moved to their over center positions when said slidable plate abuts said end wall which is immediately after said valve disk abuts said end wall so that said valve disk is thereby locked in sealing position with said sealing surface, said valve disk having a groove on the seating side thereof and an O-ring seated in said groove for engaging said sealing surface, said groove including a normally free expansion portion behind said O-ring into which the O-ring is adapted to be deformed when said O-ring is pressed against said sealing surface, said valve disk also having a port from said expansion portion of said groove to the side of said valve disk opposite to said seating side.

5. A gate valve adapted for sealing high vacuum lines, comprising a casing having a passage therethrough that is adapted to be sealed, said casing also having a chamber communicating with said passage, said chamber having a substantially flat side extending in a direction transverse to said passage, a slidable plate positioned in said chamber, a crank for engaging a slot in one end of said slidable plate, said slidable plate being adapted to be moved by said crank on said substantially flat side to cut across said passage, said chamber also having an end wall adjacent to said passage, a valve disk, links for pivotally supporting said valve disk on said slidable plate substantially parallel thereto so that when said slidable plate is moved across said passage said valve disk is also moved across said passage and abuts said end wall, said valve disk when abutting said end wall being adapted to be swung on said links and pressed into engagement with a sealing surface surrounding said passage by further movement of said slidable plate toward said end wall, said links being adapted to be moved to their over center positions when said slidable plate abuts said end wall which is immediately after said valve disk abuts said end wall so that said valve disk is thereby locked in sealing position with said sealing surface, pins for attaching said links to said valve disk and to said slidable plate, said valve disk and said slidable plate having sockets for receiving the ends of said links so that the force exerted in pressing said valve disk against said sealing surface is exerted against the ends of said links in said sockets.

References Cited in the file of this patent

UNITED STATES PATENTS

| Re. 801 | Powell | Aug. 23, 1859 |
| 114,338 | Pierce | May 2, 1871 |
| 142,700 | Isbell | Sept. 9, 1873 |
| 1,707,125 | Loffler | Mar. 26, 1929 |
| 2,204,142 | MacClatchie | June 11, 1940 |
| 2,640,677 | Craven | June 2, 1953 |
| 2,676,780 | Wheatley | Apr. 27, 1954 |
| 2,713,989 | Bryant | July 26, 1955 |
| 2,718,372 | Broz | Sept. 20, 1955 |

FOREIGN PATENTS

| 520,188 | Germany | 1931 |
| 1,095,876 | France | Dec. 29, 1954 |